US010677330B2

(12) United States Patent
Pavilcu et al.

(10) Patent No.: US 10,677,330 B2
(45) Date of Patent: Jun. 9, 2020

(54) VARIABLE SPEED-RATIO TRANSMISSION

(71) Applicant: Constantin Edyson Pavilcu, Canaro (RO) (IT)

(72) Inventors: Constantin Edyson Pavilcu, Canaro (IT); Renata Mirela Pavilcu, Canaro (IT)

(73) Assignee: Constantin Edyson Pavilcu, Canaro (RO) (IT)

( * ) Notice: Subject to any disclaimer, the term of this patent is extended or adjusted under 35 U.S.C. 154(b) by 120 days.

(21) Appl. No.: 15/779,355

(22) PCT Filed: Dec. 2, 2016

(86) PCT No.: PCT/IB2016/057310
§ 371 (c)(1),
(2) Date: May 25, 2018

(87) PCT Pub. No.: WO2017/093965
PCT Pub. Date: Jun. 8, 2017

(65) Prior Publication Data
US 2018/0306288 A1    Oct. 25, 2018

(30) Foreign Application Priority Data
Dec. 3, 2015  (IT) .......................... 102015000080167

(51) Int. Cl.
*F16H 29/18* (2006.01)
*F16H 29/12* (2006.01)
*B62M 11/14* (2006.01)

(52) U.S. Cl.
CPC ............. *F16H 29/18* (2013.01); *B62M 11/14* (2013.01); *F16H 29/12* (2013.01)

(58) Field of Classification Search
CPC .......... F16H 29/18; F16H 29/12; B62M 11/14
See application file for complete search history.

(56) References Cited

U.S. PATENT DOCUMENTS

| 1,660,356 | A |   | 2/1928 | Postel |
| 5,454,766 | A | * | 10/1995 | Mills |
| 5,516,132 | A | * | 5/1996 | Simkins |
| 5,632,702 | A | * | 5/1997 | Mills |
| 6,354,976 | B1 |   | 3/2002 | Mills |
| 9,970,521 | B1 | * | 5/2018 | Cook |
| 2014/0248990 | A1 |   | 9/2014 | Peeters |

FOREIGN PATENT DOCUMENTS

| EP | 2113685 A1 | 11/2009 |
| JP | S6081564 A | 5/1985 |
| WO | 2014023926 A1 | 2/2014 |
| WO | 2014033650 A1 | 3/2014 |

\* cited by examiner

*Primary Examiner* — Derek D Knight
(74) *Attorney, Agent, or Firm* — Volpe and Koenig, P.C.

(57) ABSTRACT

A variable speed ratio transmission comprises a support structure, an input member, an output member and a plurality of planet wheels which are supported rotatably on the support structure and which receive the movement from the input member. Each of the planet wheels comprises a connecting rod which is rotatably connected thereto in the region of a first end thereof and which supports at an opposite end thereof a unidirectional connection wheel which entrains in rotation the output member. The transmission further comprises a variation device for the spacing between the pivot axis of the connecting rods and a respective rotation axis of the planet wheels.

17 Claims, 8 Drawing Sheets

VARIABLE SPEED-RATIO TRANSMISSION

FIELD OF THE INVENTION

The invention relates to a variable speed ratio transmission of the type with infinite variation of the transmission ratio.

BACKGROUND

In the field of continuous speed variation transmissions in which the transmission ratio between the input shaft and the output shaft can vary without any interruption of continuity between two limit values, there are known solutions which allow that transmission ratio to be brought to a value equal to zero. Those transmissions are commonly called Infinitely Variable Transmissions (IVT).

However, many of the known solutions use particularly complex kinematic gear mechanisms which make them poorly versatile and intended for an extremely limited number of industrial applications.

For example, the patent application WO 2014/023926 provides for the combined use of toothed wheels, cardan joints and helical screws with a solution which is difficult to carry out and which is readily susceptible to breakage.

Another example is described in U.S. Pat. No. 6,354,976, in which there is described an infinitely variable transmission in which there is provision for the use of eccentric elements inside the kinematic chain which involve an unbalancing which urges the bearings which support the shafts during introduction and/or discharge of the transmission.

The patent application US 2014/0248990 instead provides for the use of planet gears both inside and outside a ring gear which requires radial dimensions which make the transmission poorly usable in many applications.

Therefore, the problem addressed by the present invention is to provide an infinitely variable transmission which is structurally and functionally configured to overcome all the disadvantages which are set out with reference to the cited prior art.

This problem is solved by the invention by means of a variable speed ratio transmission which is constructed according to the appended claims.

The present invention has some relevant advantages. The main advantage is that the transmission according to the present invention has a compact structure and is simple to construct. Furthermore, the kinematic mechanisms involved in the transmission according to the present invention define a kinematic chain which is relatively short.

BRIEF DESCRIPTION OF THE DRAWINGS

In addition, according to other aspects which are defined in the dependent claims, the present invention allows a simple adjustment of the transmission ratio.

The characteristics and advantages of the invention will be better appreciated from the detailed description of some embodiments thereof which are illustrated by way of non-limiting example with reference to the appended drawings, in which.

DETAILED DESCRIPTION OF THE PREFERRED EMBODIMENTS

Figure 1A:
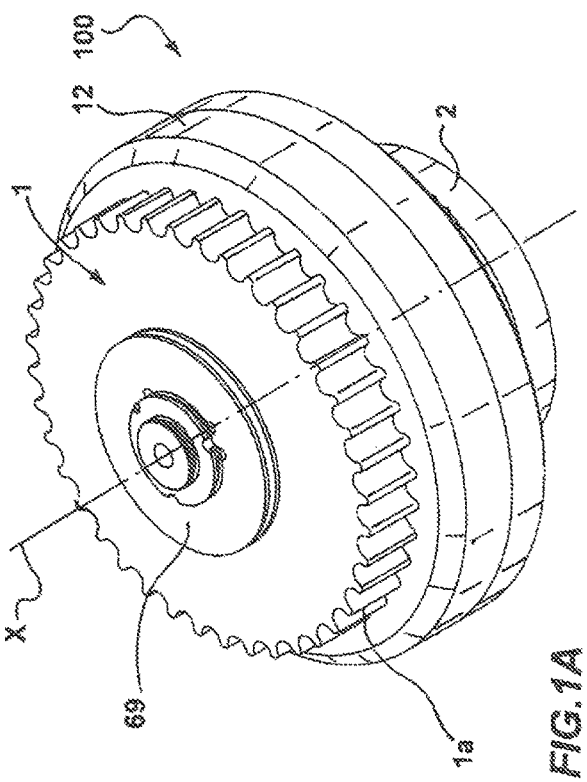

With reference initially to FIG. 1A, a variable speed ratio transmission is generally designated 100.

The transmission 100 according to the present invention comprises an input member 1 of a rotational movement about a main axis of rotation X which, in the present embodiment, comprises a toothed wheel 1$a$ which receives the movement from a chain which is not illustrated in the Figures.

As will become evident in any case below, the same concepts could also be applied if the input member comprises a wheel which is suitable for receiving the movement from a belt, or which is defined by an input shaft moved parallel with the axis X.

According to a preferred embodiment, the input member 1 further comprises a cylindrical portion 12 which is rigidly connected to the toothed wheel 1$a$. The transmission according to the present invention further comprises a support structure 10 which is preferably received inside the cylindrical portion 12.

The input member 1 is further rotatably connected to the support structure 10 about the main rotation axis X.

Figure 6A:
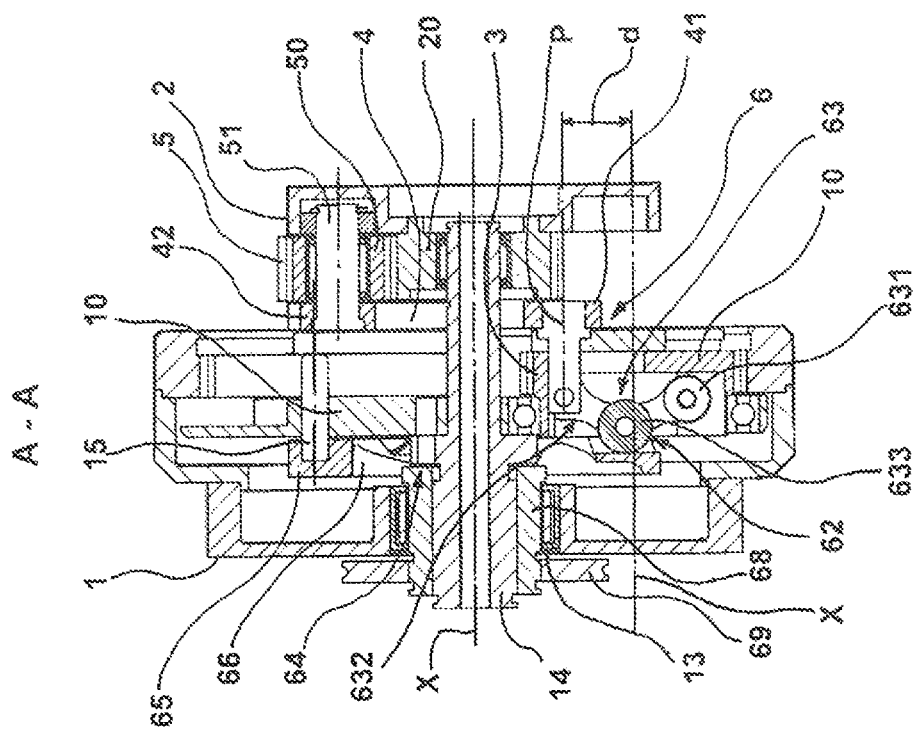
FIGS. 5A and 6A are a front view and a relevant lateral section of the transmission according to the present invention in the operating position corresponding to the maximum transmission ratio.
Figure 5A:
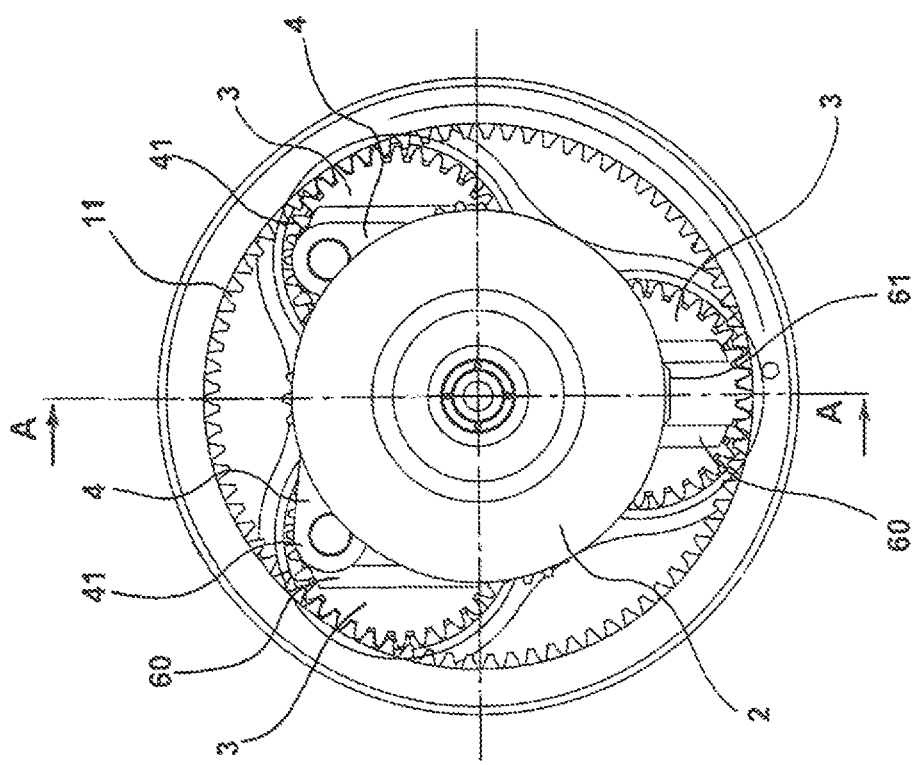

To that end, in the present embodiment the input member 1 is supported by means of a bearing 13 on a support shaft 14 which is rigidly connected to the structure 10, illustrated in FIG. 6A. Preferably, the shaft 14 is hollow so as to allow optional fixing to a pin, or other equivalent structure, for assembling the transmission, for example, in a wheel hub of a bicycle.

It is in any case evident that there could be provided different support systems of the transmission in accordance with the specific use.

Figure 2A:
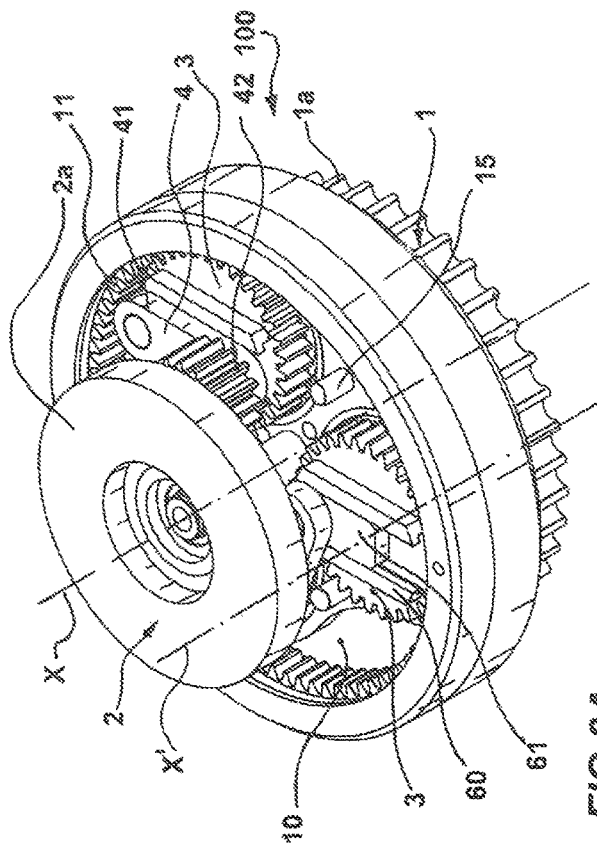
FIGS. 1A and 2A are two perspective views, a front view and a rear view, respectively, of the transmission according to the present invention in an operating position corresponding to a maximum transmission ratio.

Now with reference to FIG. 2A, the transmission according to the present invention further comprises a plurality of planet wheels 3, three planet wheels in the present embodiment, which receive the rotational movement from the input member 1.

The planet wheels 3 are rotatably supported on the support structure 10 about a respective secondary rotation axis X'.

According to a preferred embodiment, the planet wheels 3 are supported on the structure 10 by means of respective bearings 31 in suitable circular seats which are constructed in the structure 10 itself.

Preferably, the planet wheels 3 are arranged peripherally with respect to the main axis X and are distributed in a uniform manner. In other words, in the present case the rotation axes X' of the planet wheels 3 are separated from each other by an angle of 120°.

The presence of at least three planet wheels allows optimum balancing of the forces.

According to a preferred embodiment, the input member 1 comprises a ring gear 11, with which the planet wheels 3 engage. Preferably, the ring gear 11 is arranged in an axially spaced-apart position with respect to the wheel 1a. This configuration particularly allows optimization of the dimensions of the transmission, both in an axial direction and in a radial direction.

Therefore, it is evident that the rotation of the input member 1 and consequently of the ring gear 11 allows the simultaneous rotation of the planet wheels 3 in the same direction.

Figure 4A:
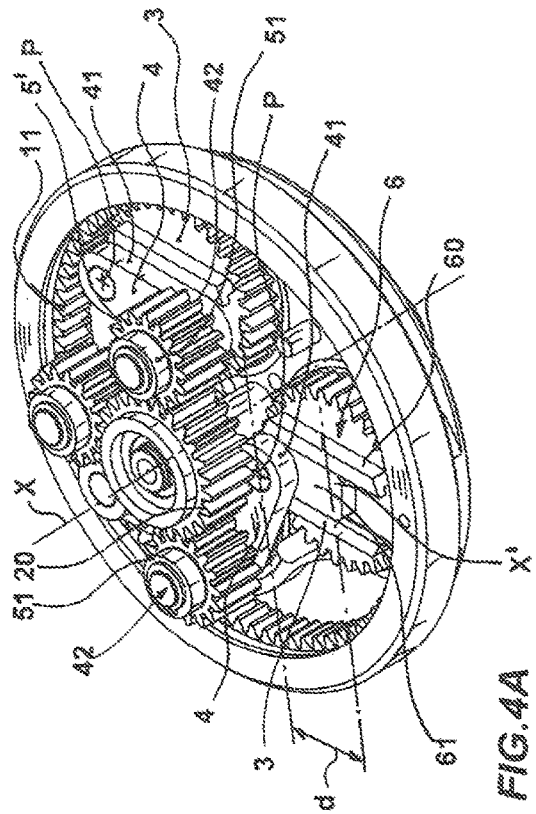
FIGS. 3A and 4A are two perspective views, a front view and a rear view, respectively, of the transmission of FIGS. 1A and 2A in which there have been removed some components for greater clarity of description.

Now with reference also to FIG. 4a, there is rotatably connected to each planet wheel 3 a connecting rod 4 in the region of a first end 41 thereof.

As will be better illustrated below, the connection between the connecting rod and the planet wheel 3 is produced in such a manner that the position of the connection location of the connecting rod to the planet wheel which is identified by a pivot axis P of the connecting rod 4 can be varied with respect to the centre of rotation of the corresponding planet wheel 3.

To that end, the transmission according to the present invention comprises a variation device 6 for the spacing d between the pivot axis P of the connecting rod 4 and the respective rotation axis X' of the corresponding planet wheel 3. The variation of that spacing can readily be appreciated in FIGS. 4A, 4B and 6A, 6B which illustrate the end 41 of the connecting rods 4 which are arranged in two different operating positions which, as will be better illustrated below, correspond to two different transmission ratios.

According to a preferred embodiment, the variation device 6 of the spacing d comprises a respective guide 60 which is fixedly joined to each planet wheel 3 and a relative runner 61 which is associated with a respective actuation device 62 which brings about the translation movement of the runner along the guide 60.

In this manner, the crank arm, which corresponds to the spacing d, of the connecting rod/crank mechanism which the assembly of the connecting rod 4/planet wheels 3 produces, can be varied.

At an opposite end 42 of the connecting rod 4, however, it is rotatably connected in a unidirectional manner to a connection wheel 5. Preferably, the connection wheel 5 is connected by means of a free wheel transmission 50 which allows the production of the unidirectional nature of the movement by means of a simple and reliable system.

The connection wheels 5 are further arranged in such a manner as to be connected to an output member 2 of the movement so as to entrain it in rotation during a limited rotational portion of the input member 1 about the main rotation axis X in accordance with the trajectory defined by the movement of the connecting rod generated by the rotation of the planet wheels 3. In other words, during a complete rotation of the wheel 3, the corresponding connection wheel 5 which is kept in contact with the output member 2 will be subjected over a portion of the movement to a relative translation movement with respect to the output member 2 in one direction and over a portion in the opposite direction. With the connection wheel 5 being rotatable in a unidirectional manner, during the translation movement in one direction, the contact between the wheel 5 and the member 2 will produce a rotational urging action thereof while in the opposite direction there will not be any transmission of the movement.

The extent of the pivoting of the connection wheel 5 is determined by the spacing d, and consequently an increase thereof will increase the distance travelled by the wheel 5 and therefore also the extent of the rotation transmitted to the output member 2, for the same rotation of the ring 11 and therefore of the input member 1.

Therefore, it is evident that there is thereby produced a transmission of the movement between the input member 1 and the output member 2 with variable transmission ratio in accordance with the spacing d.

When the spacing d is equal to zero, that is to say, the mechanism has a crank arm equal to zero, the connecting rod 4 is not subjected to any translation movement during the rotation of the ring 11 and the planet wheels 3. Therefore, the transmission 100 is in an idle position which is illustrated in FIGS. 1B to 6B, no movement being imparted to the output member 2, apart from the rotation of the input member 1.

According to a preferred embodiment, the connection wheels 5 are constructed by means of toothed wheels. Preferably, the toothed wheels engage with an output gear mechanism 20 which is illustrated in FIG. 2A and which is coaxial with the main rotation axis X and which is fixedly joined in terms of rotation to the output member 2 which, for example, may comprise a pulley 2a for transmitting the movement to other components.

In this manner, the transmission of the movement being output is carried out by means of a compact and particularly reliable solution.

Preferably, for the purpose of retaining the connection wheels 5 in an engagement position with the output member 2, the transmission according to the present invention comprises a guide device 21 which is illustrated in FIG. 6A.

In a preferred embodiment, the guide device 21 comprises a grooved profile 22, inside which a portion 51 which is fixedly joined to the connection wheel 5 can slide. To that end, the guide device 21 can be constructed by means of a disk with a recess which is formed in the side facing the connection wheels 5.

In the present embodiment, the guide device 21 is fixedly joined to the output member 2, but on the basis of a construction variant it can also be fixedly joined to the support 10, for example, fixed to the shaft 13.

Figure 3A:
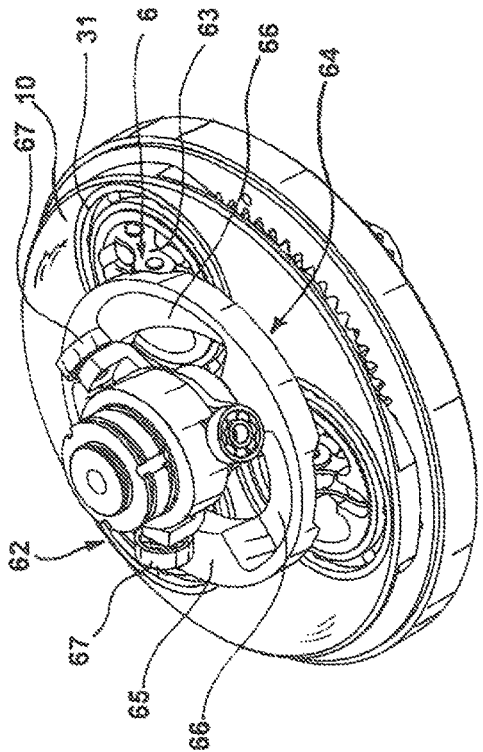
Figure 1B:
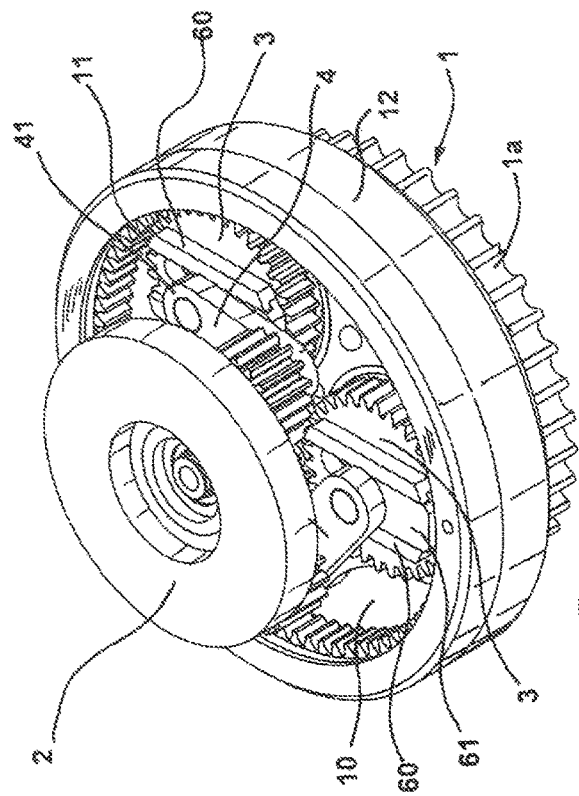
FIGS. 1B and 2B are two perspective views, a front view and a rear view, respectively, of the transmission according to the present invention in an operating position corresponding to a minimum transmission ratio.
Figure 2B:
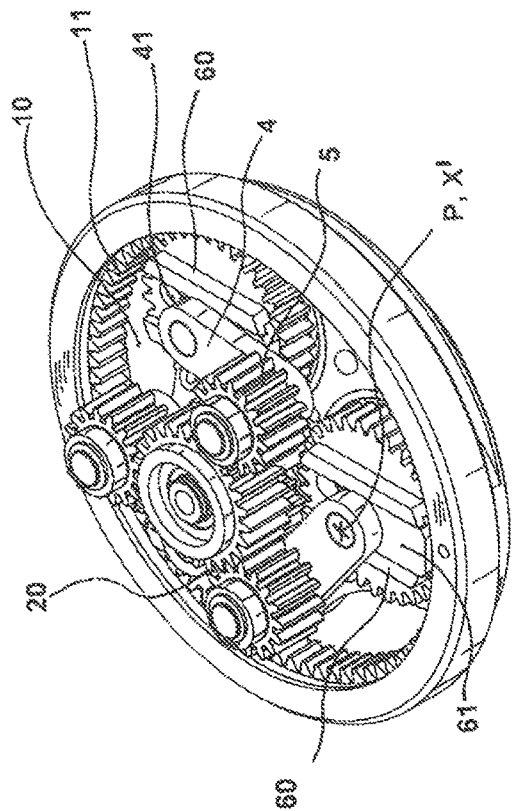
Figure 3B:
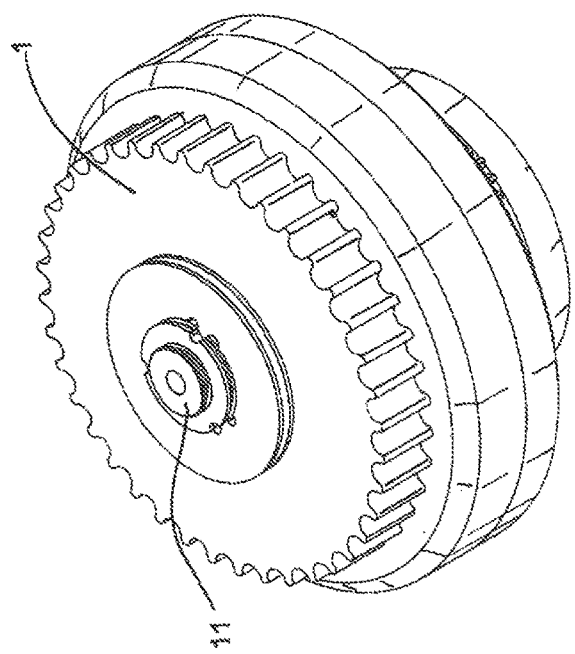
FIGS. 3B and 4B are two perspective views, a front view and a rear view, respectively, of the transmission of FIGS. 1B and 2B in which there have been removed some components for greater clarity of description.
Figure 4B:
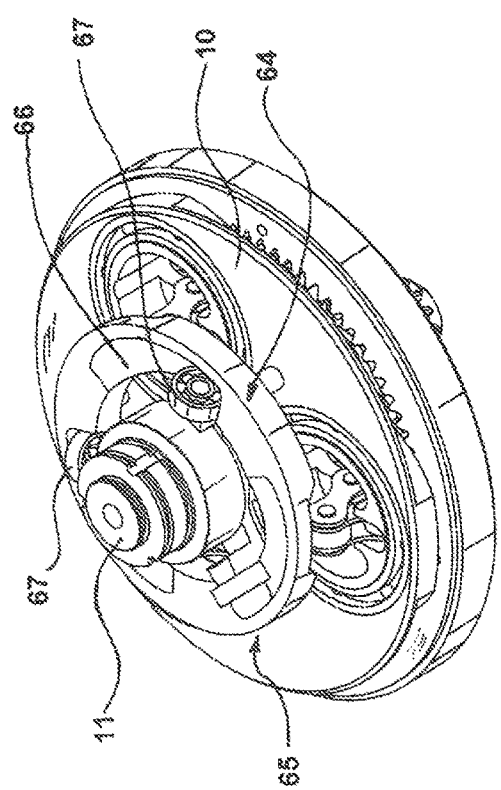

Now with reference to FIGS. 3A and 6A, according to a preferred embodiment the actuation device 62 comprises a calliper type mechanism 63 and a guide element 64 which is capable of controlling ends 631, 632 of the calliper type mechanism 63 in terms of approach movement and/or movement apart, which ends are connected to the runner 61, respectively, and therefore to the end 41 of the connecting rod 4 and the support structure 10.

Preferably, the guide element 64 comprises a pushing member 65 which is movable along the main rotation axis X so as to urge the calliper type mechanism 63 in the region of an intermediate pivot location 633 thereof, as may be observed in detail in FIG. 6A. It is in any case evident that, alternatively, there could be provision for the use of different solutions for the guide element 64. For example, there could be provision for the use of a respective guide element 64 for each actuation device 62 and/or a calliper type mechanism 63. Some of those construction variants will be described in greater detail below.

According to a preferred embodiment, the pushing member 65 is supported on the support structure 10 by means of pins 15 which extend parallel with the axis X so as to allow an approach movement/movement apart of the pushing member 65 towards/away from the support structure 10.

In this manner, in the present embodiment, when the pushing element 65 is moved towards the support structure 10, it comes into contact with the intermediate pivot location 633 which is directed away from the side of the pushing member 65.

A first end 631 of the calliper type mechanism 63 being secured to the support structure 10 and the second end 632 being secured in terms of movement in a plane perpendicular to the axis X by means of the guide 60, the action of the pushing member 65 on the intermediate pivot location 633 produces a movement apart of the two ends 631, 632 and consequently the increase of the spacing d.

Figure 6B:
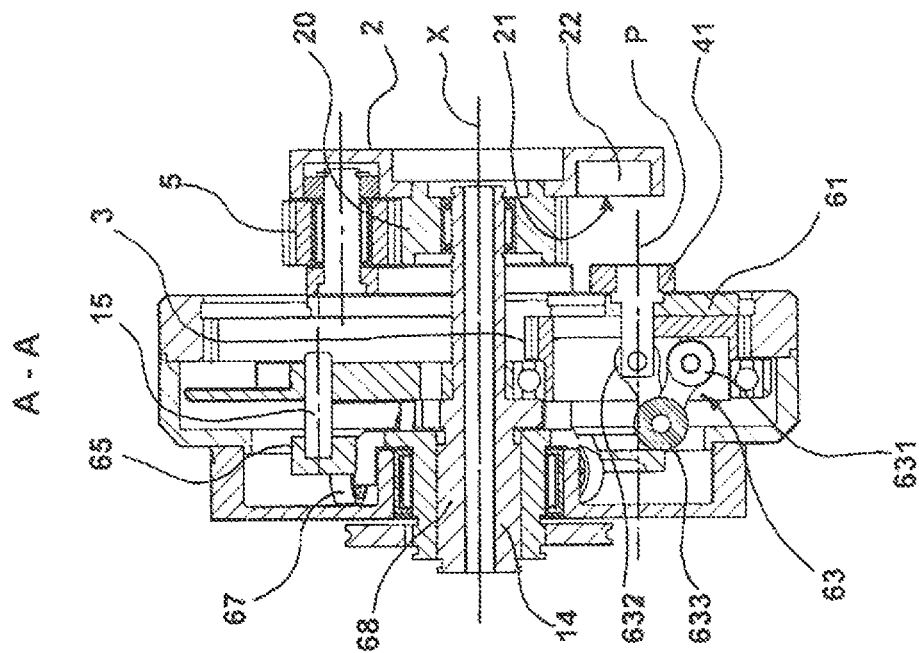
FIGS. 5B and 6B are a front view and a relevant lateral section of the transmission according to the present invention in the operating position corresponding to the minimum transmission ratio
Figure 5B:
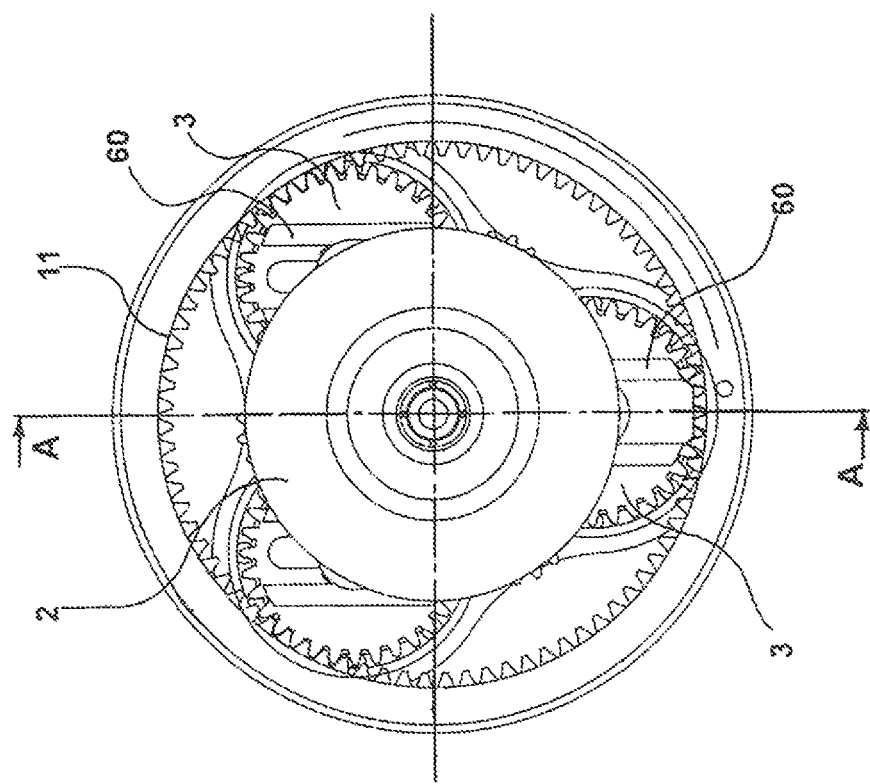

It may be noted that, according to a preferred embodiment, for the purpose of allowing the pivot member 63 to be received, the planet wheels 3 have a through-hole which is illustrated in FIGS. 6A and 6B.

In order to reduce the spacing d, it is possible to provide a resilient return mechanism which is not illustrated in the Figures and which is, for example, constructed from a torsion spring which is arranged at the intermediate pivot location 633, or it is possible to use a bidirectional connection between the intermediate pivot location 633 and the pushing member 65 which therefore keeps them fixedly joined both during approach movements of the pushing member 65 towards the support 10 and during movements away therefrom.

The above-described solution therefore has the advantage of allowing a simple simultaneous adjustment of the spacing d of all the planet wheels 3 with a solution which is based only on simple kinematic mechanisms.

According to a preferred embodiment, the pushing member 65 is actuated by means of a cylindrical cam type mechanism.

Preferably, the cylindrical cam type mechanism comprises at least one guide portion 66 which extends in accordance with a circumferential arc with a centre which is located on the main rotation axis X, the portion 66 defining a surface with variable spacing in an axial direction from the support structure 10.

The mechanism further comprises a corresponding abutment element 67, preferably comprising a roller which can slide on the guide portion 66.

The contact between the guide portion 66 and the abutment element 67 therefore allows the movement of the pushing member 65 with respect to the support structure 10, as may be observed by comparing FIGS. 6A and 6B.

Preferably, the abutment element 67 can be rotated about the main rotation axis X. To that end, there are advantageously provided three rollers which are uniformly distributed about the axis X.

As better illustrated in FIG. 6B, the abutment element 67 is supported by means of a bush 68 which is rotatably mounted on the shaft 14.

In the present embodiment, the bush 68 is axially projecting with respect to the input member 1 so as to be able to be actuated, preferably by means of a pulley 69.

Consequently, by rotating the pulley 69, it is possible to actuate the abutment element 67 and, in a cascading manner, the pushing member 65 and the pivot member 63, so as to adjust the spacing d in accordance with what has been discussed above.

Therefore, it is evident that this solution allows a purely mechanical actuation which can readily be actuated remotely, for example, using transmission cables.

Finally, it may be noted that, with reference to FIG. 6A, according to a preferred embodiment, the transmission according to the present invention has the central shaft 14, to which there is rigidly connected the support structure 10 which extends both through the input member 1 and through the output member 2, both being supported by means of respective bearings on the shaft 14 itself.

In any case, it is evident that this relation could be inverted by using an external fixed structure which supports the input and output members in a rotatable manner. Those variants are in any case within the reach of a person skilled in the art and for that reason will not be described in greater detail.

Figure 7:
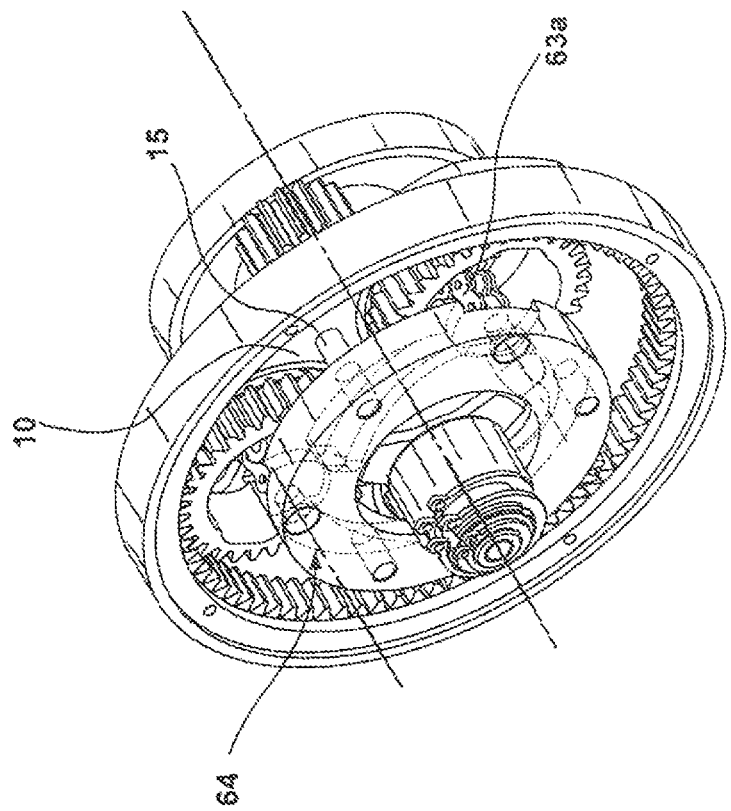
FIGS. 7 and 7A are a perspective view and a lateral section view, respectively, of a variable speed ratio transmission according to a first alternative embodiment of the present invention, the perspective view showing some components in hidden line for proper representation thereof.
Figure 7A:
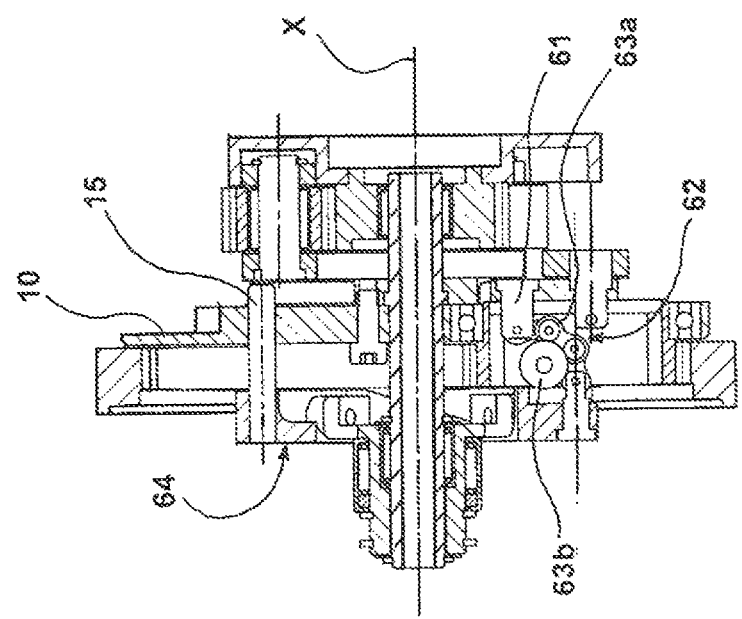

Now with reference to FIGS. 7 and 7A, according to a first construction variant the actuation device 62 comprises a chain 63a, or another flexible linear element, which is partially wound on a roller 63b.

The ends of the chain 63a are connected to the runner 61 and the guide element 64, respectively. When the guide element 64 is moved in an axial direction, in particular in the direction away from the support structure 10, the chain 63a transmits the movement to the runner 61, bringing about the adjustment of the spacing d according to concepts similar to those described above. Furthermore, there could be provided a biasing mechanism, for example, constructed by means of a resilient element, which is not illustrated in the Figures and which moves the runner in the opposite direction when the guide element 64 moves towards the support structure 10.

Figure 8:
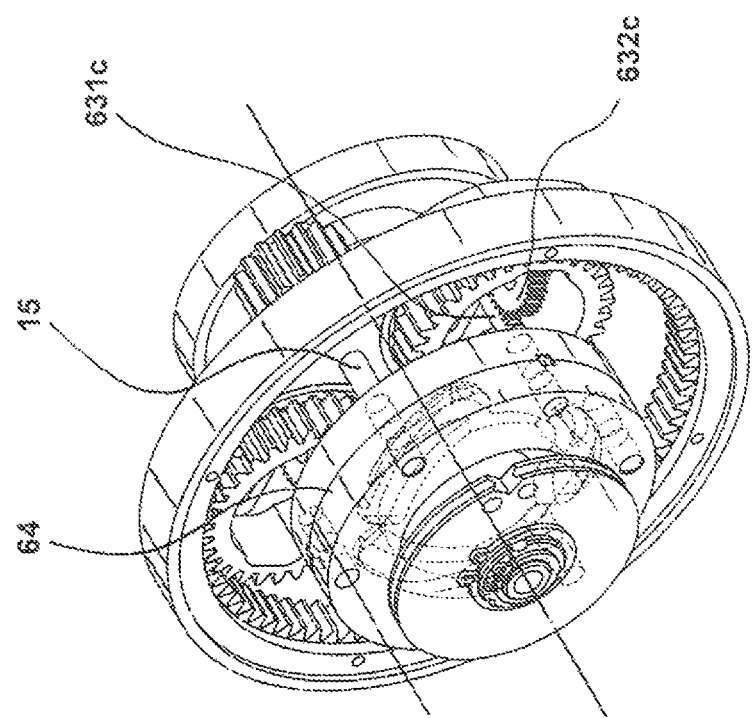
FIGS. 8 and 8A are a perspective view and a lateral section view, respectively, of a variable speed ratio transmission according to a second alternative embodiment of the present invention, the perspective view showing some components in hidden line for proper representation thereof.
Figure 8A:
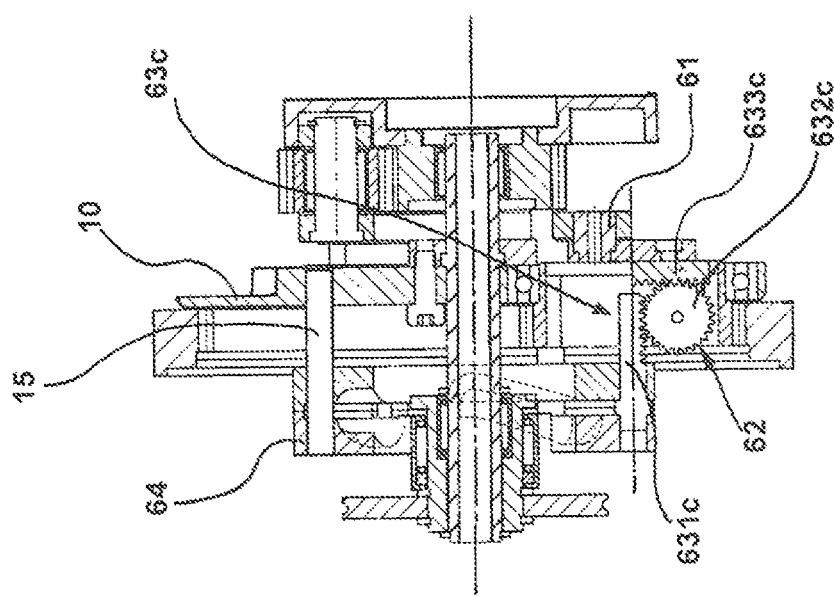

Another construction variant is described in FIGS. 8 and 8A and provides for the use of a double rack mechanism 63c.

According to the present embodiment, the actuation device 62 comprises a first toothed rod 631c, which preferably has an extent parallel with the axis X and which is rigidly connected to the guide element 64, a toothed wheel 632c which is rotated by means of connection with respect to the first toothed rod 631c, in accordance with the translation movement thereof along the axis X, and a second toothed rod 633c, which is fixedly joined to the runner 61 and which is moved by means of connection with respect to the toothed wheel 632c.

Figure 9:
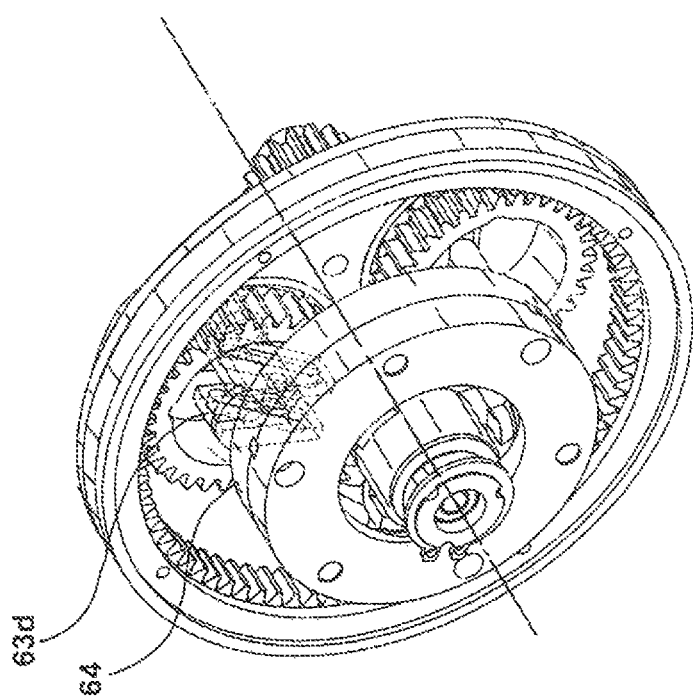
FIGS. 9 and 9A are a perspective view and a lateral section view, respectively, of a variable speed ratio transmission according to a third alternative embodiment of the present invention, the perspective view showing some components in hidden line for proper representation thereof.
Figure 9A:
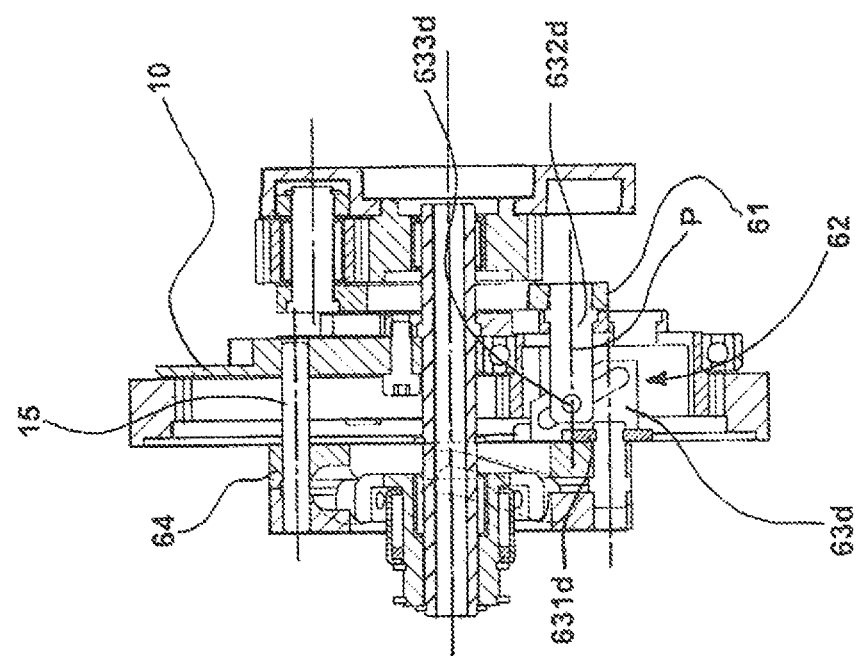

Yet another construction variant is described in FIGS. 9 and 9A in which the actuation device comprises a member 63d which is fixedly joined to the guide element 64 and which has an inclined plane 631d, preferably defined by a guide.

According to the present embodiment, an extension piece 632d of the runner 61 is formed so as to slide in the inclined plane 631d. In this manner, a translation movement of the guide element 64 and the relevant member 63d involves a corresponding translation movement of the runner 61 in accordance with the inclination angle of the inclined plane 631*d*.

Preferably, the connection between the extension piece 632*d* and the inclined plane 631*d* is obtained by means of a slot which is formed in the member 63*d* and a pin 633*d* which is slidingly received therein.

It may be noted that in general in the embodiments described here the actuation device 62 comprises at least one guide element 64 which is capable of controlling the movement of the runner 61. The actuation device 62 is therefore capable of converting a movement component along the main rotation axis X of the guide element 64 and/or the pushing member 65 into a movement of the runner 61, or in any case of the pivot axis P of the respective connecting rod 4, in a plane perpendicular to the axis X.

Figure 10:
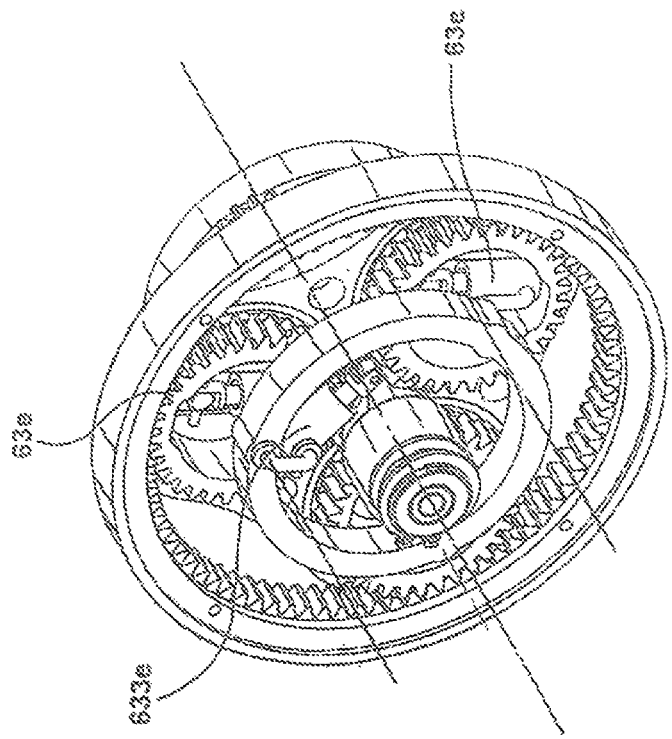
FIGS. 10 and 10A are a perspective view and a lateral section view, respectively, of a variable speed ratio transmission according to a fourth alternative embodiment of the present invention.
Figure 10A:
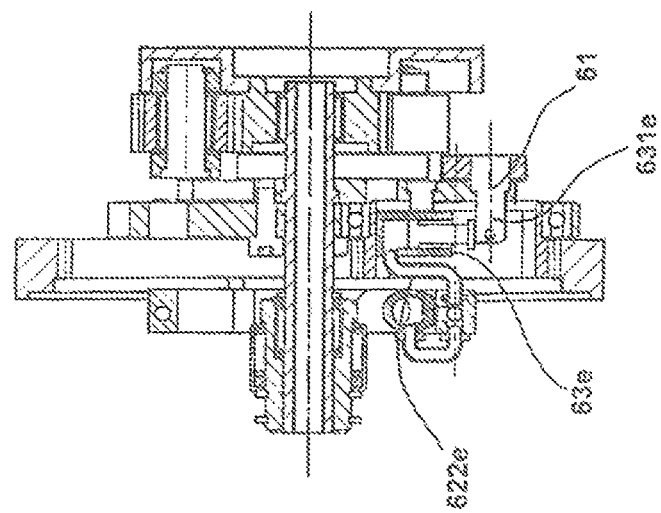

An additional embodiment is described in FIGS. 10 and 10A, in which the actuation device 62 comprises a hydraulic cylinder 63*e* which is provided for varying the spacing d. Preferably, the cylinder 63*a* acts on an extension piece 631*e* of the runner 61, bringing about the movement thereof.

According to that embodiment, the hydraulic actuation of the cylinder 63*e* can be carried out by using a series of channels 632*e* which place it in communication with a second hydraulic cylinder 633*e*.

Preferably, the cylinders 633*e* are connected at an end thereof to the bush 68, by means of the rotation of which the cylinder 633*e* is controlled in terms of extension/contraction.

This allows the production of a hydraulic liquid flow which is present in the hydraulic circuit which is formed by cylinders 63*e* and 633*e* and the channels 632*e* and which actuates the cylinder 63*e*, thereby obtaining the variation of the spacing d in a manner similar to that described with reference to the other embodiments.

Alternatively, the channels 632*e* may allow the cylinders 63*e* to be placed in communication with the outer side of the transmission 100 so as to connect it to an external hydraulic circuit which allows the production of a flow of fluid similarly to what has been set out above.

The invention thereby solves the problem set out, achieving at the same time a plurality of advantages. The transmission 100 allows the production of an infinite speed ratio between the input member 1 and the output member 2 with a simple and reliable solution.

The overall dimensions can further be readily contained both in an axial direction and in a radial direction.

The same inventive concepts are further suitable for being used with different geometries, thereby making the transmission according to the present invention suitable for multiple applications, such as, for example, in the automotive sector, in bicycles or as a step-down gear for wind turbines.

The invention claimed is:

1. A variable speed ratio transmission (100) comprising:
 a support structure (10);
 an input member (1) of a rotational movement about a main axis of rotation (X) which is rotatably connected to the support structure (10);
 an output member (2) of the rotational movement;
 a plurality of planet wheels (3) which are arranged peripherally with respect to the main rotation axis (X) and which are supported rotatably on the support structure (10) and which receive the movement from the input member (1); each of said planet wheels (3) comprises a connecting rod (4) which is rotatably connected thereto in the region of a first end (41) thereof and which supports at an opposite end (42) thereof a connection wheel (5) which is rotatably connected in a unidirectional manner to the end so as to entrain in rotation the output member (2) during a rotational movement of the input member (1) about the main rotation axis (X), the variable speed ratio transmission (100) further comprises a variation device (6) for a spacing (d) between a pivot axis (P) of the connecting rods (4) on the planet wheels (3) and a respective rotation axis (X') of the planet wheels (3).

2. The transmission (100) according to claim 1, wherein the variation device for the spacing (d) comprises a respective guide (60) which is fixedly joined to each planet wheel (3), a relative runner (61) and an actuation device (62) for movement of the runner (61) along that guide (60).

3. The transmission (100) according to claim 2, wherein the actuation device (62) comprises at least one guide element (64) which is configured to control the movement of the runner (61), the actuation device (62) being configured to convert a movement component along the main rotation axis (X) of the guide element (64) into a movement of the runner (61) in a plane perpendicular to the main rotation axis (X).

4. The transmission (100) according to claim 3, wherein the guide element (64) comprises a pushing member (65) which is actuated by a cam mechanism.

5. The transmission (100) according to claim 3, wherein the pushing member (65) is actuated by a cylindrical cam mechanism.

6. The transmission (100) according to claim 3, wherein the guide element (64) is actuated by an abutment element (67) which is rotatable about the main rotation axis (X).

7. The transmission (100) according to claim 3, wherein the actuation device (62) comprises a caliper mechanism (63), the guide element (64) being capable of controlling ends (631, 632) of the caliper mechanism (63) in terms of approach movement and/or movement apart, the ends (631, 632) of the caliper mechanism (63) being connected to the runner (61) and the support structure (10), respectively.

8. The transmission (100) according to claim 3, wherein the actuation device (62) comprises a flexible linear element (63*a*) which is partially wound on a roller (63*b*) which comprises respective ends which are connected to the runner (61) and the guide element (64), respectively.

9. The transmission (100) according to claim 1, wherein the actuation device (62) comprises a hydraulic cylinder (63*e*) which is provided for the variation of the spacing (d).

10. The transmission (100) according to claim 1, wherein the connection wheel (5) is toothed and engages with an output gear mechanism (20) which is coaxial with the main rotation axis (X) and which is fixedly joined in terms of rotation to the output member (2).

11. The transmission (100) according to claim 1, wherein the input member (1) comprises a ring gear (11), with which the planet wheels (3) engage.

12. The transmission (100) according to claim 1, wherein the support structure (10) comprises a central support shaft (14).

13. The transmission (100) according to claim 12, wherein the central support shaft (14) is hollow.

14. The transmission (100) according to claim 1, further comprising a guide device (21) which is capable of retaining the connection wheels (5) in an engagement position with the output member (2).

15. The transmission (100) according to claim 14, wherein the guide device (21) comprises a grooved profile (22), inside which a portion (51) which is fixedly joined to the connection wheel (5) can slide.

16. The transmission (100) according to claim 1, wherein the connection wheels (5) are connected to the opposite end (42) of the connecting rod (4) by means of a free wheel transmission (50).

17. The transmission (100) according to claim 1, wherein there are three planet wheels (3) which are uniformly distributed about the main rotation axis (X) with a separation angle equal to 120°.

* * * * *